Figure 1:
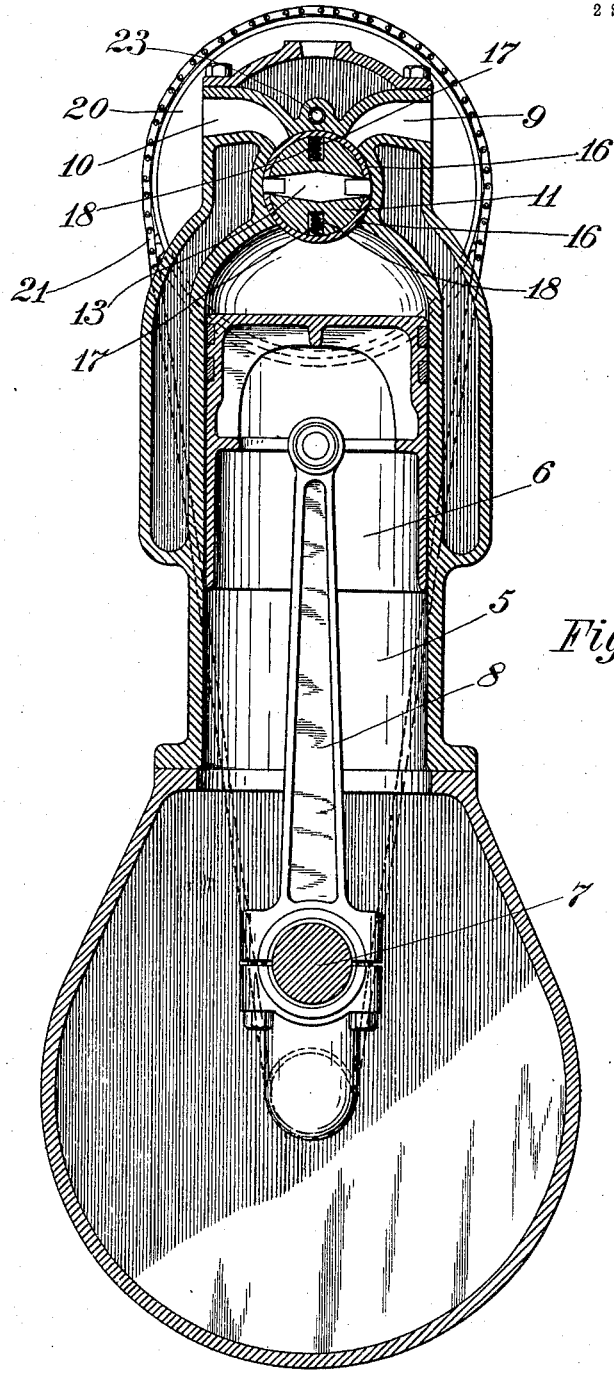

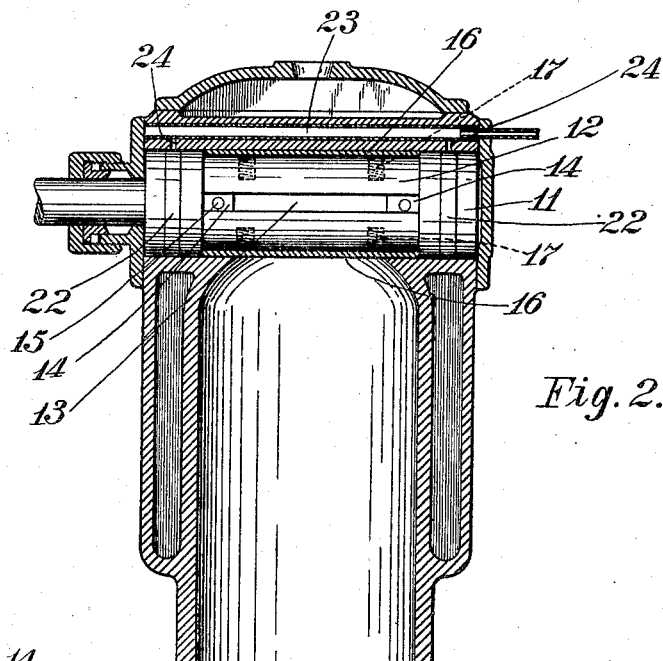
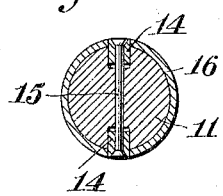
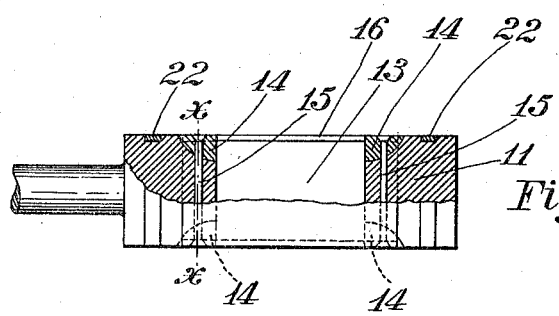

UNITED STATES PATENT OFFICE.

CHARLES O. HOWARD, OF COLUMBUS, OHIO.

ROTARY-VALVE PACKING.

1,032,480.  Specification of Letters Patent.  Patented July 16, 1912.

Application filed October 31, 1911. Serial No. 657,733.

*To all whom it may concern:*

Be it known that I, CHARLES O. HOWARD, a citizen of the United States, residing at Columbus, in the county of Franklin and State of Ohio, have invented a certain new and useful Improvement in Rotary-Valve Packings, of which the following is a specification.

The object of this invention is more especially to provide an improved packing for a rotary valve in a gas engine.

The invention is embodied in the construction herein shown and described and then pointed out in the claims.

In the accompanying drawings forming part hereof, Figure 1 is a vertical section of an engine taken transversely of the valve. Fig. 2, is a section of the upper end of the cylinder taken longitudinally of the valve. Fig. 3, is a detail of the valve which here is shown partly in section and partly in full lines. Fig. 4 is a transverse section on line *x—x* Fig. 3.

The cylinder 5, piston 6, crank shaft 7, and the connecting rod 8 for the piston and crank shaft are of any suitable or ordinary construction. In the upper end of the cylinder is a cylindrical valve seat having an intake passage 9 and an exhaust passage 10, each ported in the upper part of the valve seat.

The valve comprises a body portion 11 of generally cylindrical form but it is cut out or reduced annularly between its ends as indicated at 12 and pierced diametrically as indicated at 13 to form a passage for either the intake or exhaust according to its position. The body of the valve at and beyond each end of the passage therein and on both sides of the body is cut out to form seats to receive blocks 14 which are secured to the body by means of a rivet 15, one for each diametrically opposite pair. The outer surfaces of these blocks coincide with the surface of the valve body in its larger diameter and therefore form abutments in the reduced portion of the valve body.

The packing shoes, designated 16, 16, are of nearly semi-cylindrical form, and they are located on opposite sides of the valve body in the reduced portion thereof and nearly abut at the ends of their opposite straight edges against the blocks 14. Each of said shoes extends at its opposite straight edges to the terminals of the valve passage 13 but do not obstruct the valve passage. The said shoes 16, 16, are kept in position on the valve body so as not to obstruct the valve passage by the blocks 14. The said shoes are shown as backed by centrally located coiled springs 17 seated in sockets 18 in the body of the valve. These shoes are made to fit on the valve body with a little looseness so that the springs 17 shall tend to hold them against the valve seat. The valve body is mainly supported in its seat at its ends. Therefore when an explosion takes place in the cylinder the thrust thereof on the lower packing shoe 16 is borne first by the blocks 14 and thence transmitted to the valve body and its bearings and the ends thereof leaving the upper shoe free to be closed on the upper part of the seat contiguous to the terminals of the intake and exhaust passage.

The shaft of the valve is shown as provided with a large sprocket wheel 20 over which runs an appropriate chain 21 from a small sprocket wheel on the main crank shaft the relation between the sprocket wheels being such that four revolutions of the crank shaft cause one of the valve for four cycle operation.

At its ends the valve body is provided with ordinary packing rings 22 which may be employed if desired to prevent leakage in that direction.

The valve can be lubricated through a tube 23 in the head of the cylinder and holes 24 leading therefrom to the valve seat.

It will be observed that because the explosion does not operate on the uppermost or port closing shoe and because that shoe is free to close against the surfaces contiguous to the ports no gases can escape around that portion of the valve seat when the explosion takes place.

What I claim is:

1. In a gas engine, in combination, a rotary valve body having a transverse passage, packing shoes on opposite sides of the valve body, each shoe having two of its opposite edges extending to points near the opposite terminals of said passage and abutments near the end walls of said passage and between the adjacent edges of said shoes and adapted to keep said shoes separated and from closing the passage.

2. In a gas engine, in combination, a rotary valve body having a transverse passage, packing shoes on opposite sides of the valve body, each of said packing shoes having two of its opposite edges extending to points adjacent the terminals of said passage, and means for holding each of said shoes in position between said terminals.

3. In a gas engine, in combination, a rotary valve body having an annularly reduced portion, a transverse passage in said reduced portion, abutments near the end walls forming said passage and packing shoes on the opposite sides of the valve body in said annularly reduced portion adapted to be thrust toward said abutments.

CHARLES O. HOWARD.

Witnesses:
BENJAMIN FINCKEL,
GERTRUDE LOWRY.

---

Copies of this patent may be obtained for five cents each, by addressing the "Commissioner of Patents, Washington, D. C."